(12) United States Patent
Spreafico et al.

(10) Patent No.: US 11,936,048 B2
(45) Date of Patent: Mar. 19, 2024

(54) ELECTRODE-FORMING COMPOSITIONS

(71) Applicant: SOLVAY SPECIALTY POLYMERS ITALY S.P.A., Bollate (IT)

(72) Inventors: Marco Alberto Spreafico, Eindhoven (NL); Ségolène Brusseau, Tavaux (FR); Julio A. Abusleme, Saronno (IT); Alessandro Ghielmi, Frankfurt am Main (DE); Giulio Brinati, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 712 days.

(21) Appl. No.: 17/055,240

(22) PCT Filed: May 16, 2019

(86) PCT No.: PCT/EP2019/062551
§ 371 (c)(1),
(2) Date: Nov. 13, 2020

(87) PCT Pub. No.: WO2019/219788
PCT Pub. Date: Nov. 21, 2019

(65) Prior Publication Data
US 2021/0257621 A1  Aug. 19, 2021

(30) Foreign Application Priority Data
May 17, 2018 (EP) .................................... 18305615

(51) Int. Cl.
| | |
|---|---|
| *H01M 4/62* | (2006.01) |
| *H01M 4/04* | (2006.01) |
| *H01M 4/131* | (2010.01) |
| *H01M 4/1391* | (2010.01) |
| *H01M 4/505* | (2010.01) |
| *H01M 4/525* | (2010.01) |
| *H01M 10/0525* | (2010.01) |
| *H01M 4/02* | (2006.01) |
| *H01M 10/052* | (2010.01) |

(52) U.S. Cl.
CPC .......... *H01M 4/623* (2013.01); *H01M 4/0404* (2013.01); *H01M 4/131* (2013.01); *H01M 4/1391* (2013.01); *H01M 4/505* (2013.01); *H01M 4/525* (2013.01); *H01M 10/0525* (2013.01); *H01M 2004/028* (2013.01); *H01M 10/052* (2013.01); *Y02E 60/10* (2013.01)

(58) Field of Classification Search
CPC ........... H01M 10/052; H01M 10/0525; H01M 2004/028; H01M 4/0404; H01M 4/131; H01M 4/1391; H01M 4/505; H01M 4/525; H01M 4/623; Y02E 60/10
See application file for complete search history.

(56) References Cited

U.S. PATENT DOCUMENTS

| | | | |
|---|---|---|---|
| 5,609,975 A | 3/1997 | Hasegawa et al. | |
| 9,236,612 B2 | 1/2016 | Igarashi et al. | |
| 2010/0266882 A1* | 10/2010 | Igarashi ................. | H01M 4/043 429/94 |
| 2015/0228969 A1 | 8/2015 | Cho et al. | |

FOREIGN PATENT DOCUMENTS

| | | |
|---|---|---|
| WO | 2007006645 A1 | 1/2007 |
| WO | 2007006646 A1 | 1/2007 |
| WO | 2013023983 A1 | 2/2013 |

* cited by examiner

*Primary Examiner* — Lingwen R Zeng
(74) *Attorney, Agent, or Firm* — Osha Bergman Watanabe & Burton LLP

(57) ABSTRACT

Positive electrode-forming compositions including a) at least one positive electrode active material (AM), b) at least one binder (B) comprising at least one vinylidene fluoride copolymer [polymer (A)] that includes repeating units derived from vinylidene fluoride (VDF), recurring units derived from a fluoroalkylvinyl ether (FVE) monomer and recurring units derived from at least one hydrophilic (meth) acrylic monomer (MA) and c) at least one solvent, a process for their manufacture and their use thereof for manufacturing electrodes fix high-capacity nickel-rich lithium ion batteries.

17 Claims, No Drawings

ELECTRODE-FORMING COMPOSITIONS

CROSS-REFERENCE TO RELATED APPLICATIONS

This application is a U.S. national stage entry under 35 U.S.C. § 371 of International Application No. PCT/EP2019/062551 filed May 16, 2019, which claims priority to European application No. 18305615.9, filed on May 17, 2018. The entire contents of these applications are explicitly incorporated herein by this reference.

TECHNICAL FIELD

The present invention pertains to an electrode-forming composition comprising copolymers vinylidene fluoride/fluoroalkylvinylether, to a process for their manufacture and to the use thereof for manufacturing electrodes for high-capacity nickel-rich lithium ion batteries.

BACKGROUND ART

Energy generation and storage has long been a subject of study and development. Storage of electrical energy in a compact form that can be readily charged and discharged such as rechargeable electrochemical batteries and/or electrochemical capacitors is of special importance. High power, high energy, rechargeable energy storage devices are necessary to power devices that have a wide range of electrical requirements. Examples of such devices include digital communication devices, power tools, and portable computers to name but a few.

The electrodes for lithium batteries are usually produced by mixing a binder with a powdery electrode forming material. For some current commercial batteries, the negative electrode forming material can be graphite, and the positive electrode forming materials can be nickel-containing oxides such as lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like.

The binder needs to exhibit durability against the non-aqueous electrolytic solution present in the battery, which is obtained by dissolving an electrolyte such as $LiPF_6$, $LiClO_4$ or the like in a nonaqueous solvent such as ethylene carbonate, propylene carbonate or the like.

Fluororesins such as vinylidene fluoride-based polymers have been used as binders for forming positive electrodes. In particular, polyvinylidene fluoride (PVDF) provides a good electrochemical stability and high adhesion to the electrode materials and to current collectors. PVDF is therefore a preferred binder material for electrode slurries. However, PVDF, in particular when used in the form of slurry for forming positive electrodes, has an important drawback, in that the slurry often undergoes to a rapid viscosity increase, leading to the formation of a gel. This tendency to gelation is especially promoted when carbon black is added as conductive aid.

US20150228969 (UNIST ACADEMY-INDUSTRY RESEARCH CORPORATION) 13 Aug. 2015 discloses a positive active material for a rechargeable lithium battery capable of preventing gelation of an electrode slurry comprising VDF-polymers as binder, by suppressing gas generation during battery operation thanks to a surface treatment of a nickel-rich-based positive active material by applying a stable coating layer on the surface of the compound, wherein the coating layer includes vanadium oxide, lithium vanadium oxide, or a combination thereof.

The present invention provides a positive electrode-forming composition capable of preventing gelation while, at the same time, enabling the manufacturing of electrodes having enhanced flexibility, adhesion and electrochemical stability.

DISCLOSURE OF INVENTION

The Applicant has now found that it is possible to ensure excellent performances in secondary batteries comprising high energy electrodes made from electrode-forming compositions capable of preventing gelation.

It is thus an object of the invention a positive electrode-forming composition (C) comprising:
a) at least one positive electrode active material (AM), wherein the active material (AM) is selected from lithium-containing complex metal oxides of general formula (I)

$$LiNi_xM^1_yM^2_zY_2 \qquad (I)$$

wherein $M^1$ and $M^2$ are the same or different from each other and are transition metals selected from Co, Fe, Mn, Cr and V, $0.5 \leq x \leq 1$, wherein $y+z=1-x$, and
Y denotes a chalcogen, preferably selected from O and S;
b) at least one binder (B), wherein binder (B) comprises at least one vinylidene fluoride (VDF) copolymer [polymer (A)] that comprises:
  (i) recurring units derived from vinylidene fluoride (VDF);
  (ii) recurring units derived from a fluoroalkylvinylether (FVE) monomer,
wherein the (FVE) monomer is selected from the group consisting of:
  a (halo)fluoroalkylvinylether complying with formula $CF_2=CFOR_{f1}$ in which $R_{f1}$ is a $C_1$-$C_{12}$-fluoro-(halo)alkyl group or $C_1$-$C_{12}$-perfluoro-(halo)alkyl group, optionally comprising at least one halogen atom different from fluorine;
  a (halo)fluorooxyalkylvinylether group of complying with formula $CF_2=CFOR_{OF}$, with $R_{OF}$ being a $C_1$-$C_6$-(halo)fluorooxyalkyl or $C_1$-$C_6$-per(halo)fluorooxyalkyl group, optionally comprising at least one halogen atom different from fluorine, which comprises one or more than one ethereal oxygen atom; and preferably $R_{OF}$ being a group of formula $-CF_2OR_{f2}$ or $-CF_2CF_2OR_{f2}$, with $R_{f2}$ being a $C_1$-$C_6$-(halo)fluoroalkyl or $C_1$-$C_6$-per(halo)fluoroalkyl group, optionally comprising at least one halogen atom different from fluorine; and
  (iii) optionally, recurring units derived from at least one hydrophilic (meth)acrylic monomer (MA) of formula (II):

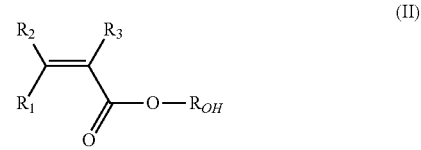

wherein each of $R_1$, $R_2$, $R_3$, equal or different from each other, is independently an hydrogen atom or a $C_1$-$C_3$ hydrocarbon group, and $R_{OH}$ is a hydrogen or a $C_1$-$C_5$ hydrocarbon moiety comprising at least one —COOH group, wherein the total amount of recurring units (ii) and recurring units (iii), when present, in said polymer (A) is of at most 15% by moles, preferably at most 7% by moles, more preferably at most 4% by moles, with respect to the total moles of recurring units of polymer (A);

c) at least one solvent (S).

In a second instance, the present invention pertains to the use of the electrode-forming composition (C) of the invention in a process for the manufacture of an electrode for electrochemical devices [electrode (E)], said process comprising:

(i) providing a metal substrate having at least one surface;
(ii) providing an electrode-forming composition (C) as defined above;
(iii) applying the composition (C) provided in step (ii) onto the at least one surface of the metal substrate provided in step (i), thereby providing an assembly comprising a metal substrate coated with said composition (C) onto the at least one surface;
(iv) drying the assembly provided in step (iii).

In a third instance, the present invention pertains to the electrode (E) obtainable by the process of the invention.

In a fourth instance, the present invention pertains to an electrochemical device comprising an electrode (E) of the present invention.

DESCRIPTION OF EMBODIMENTS

The positive electrode active material (AM) is preferably a compound of formula (I) wherein Y is O.

In a preferred embodiment, $M^1$ is Mn and $M^2$ is Co.

In another preferred embodiment, $M^1$ is Co and $M^2$ is Al.

Examples of such active materials include $LiNi_xMn_yCo_zO_2$, herein after referred to as NMC, and $LiNi_xCo_yAl_zO_2$, herein after referred to as NCA.

Specifically with respect to $LiNi_xMn_yCo_zO_2$, varying the content ratio of manganese, nickel, and cobalt can tune the power and energy performance of a battery.

In a preferred embodiment of the present invention, the active material (AM) is a compound of formula (I) as above defined, wherein 0.5≤x≤1, 0.1≤y≤0.5, and 0≤z≤0.5.

Non limitative examples of suitable positive electrode active materials (AM) of formula (I) include, notably:
$LiNi_{0.5}Mn_{0.3}Co_{0.2}O_2$,
$LiNi_{0.6}Mn_{0.2}Co_{0.2}O_2$,
$LiNi_{0.8}Mn_{0.1}Co_{0.1}O_2$,
$LiNi_{0.8}Co_{0.15}Al_{0.05}O_2$, and
$LiNi_{0.8}Co_{0.2}O_2$.

Active materials (AM) which have been found particularly advantageous are $LiNi_{0.8}Co_{0.15}Al_{0.05}O_2$, $LiNi_{0.6}Mn_{0.2}Co_{0.2}O_2$ and $LiNi_{0.8}Mn_{0.1}Co_{0.1}O_2$.

By the term "recurring unit derived from vinylidene difluoride" (also generally indicated as vinylidene fluoride 1,1-difluoroethylene, VDF), it is intended to denote a recurring unit of formula $CF_2=CH_2$.

The term "at least one hydrophilic (meth)acrylic monomer (MA)" is understood to mean that the polymer (A) may comprise recurring units derived from one or more than one hydrophilic (meth)acrylic monomer (MA) as above described. In the rest of the text, the expressions "hydrophilic (meth)acrylic monomer (MA)" and "monomer (MA)" are understood, for the purposes of the present invention, both in the plural and the singular, that is to say that they denote both one or more than one hydrophilic (meth)acrylic monomer (MA).

Non-limitative examples of hydrophilic (meth)acrylic monomers (MA) of formula (III) include, notably:
acrylic acid (AA)
(meth)acrylic acid,
and mixtures thereof.

The hydrophilic (meth)acrylic monomer (MA) preferably complies with formula (III) here below:

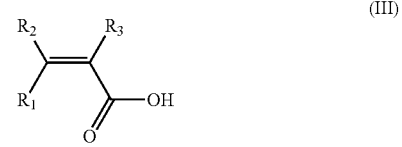

wherein each of $R_1$, $R_2$ and $R_3$, equal to or different from each other, is independently a hydrogen atom or a $C_1$-$C_3$ hydrocarbon group.

Still more preferably, the hydrophilic (meth)acrylic monomer (MA) is acrylic acid (AA).

Should the hydrophilic (meth)acrylic monomer (MA) of formula (II) be comprised in polymer (A), it is typically comprised in an amount of from 0.05% to 2% by moles, preferably from 0.1 to 1.8% by moles, more preferably from 0.2 to 1.5% by moles with respect to the total moles of recurring units of polymer (A).

The (FVE) monomer is preferably a perfluoroalkylvinylether (PFVE) monomer, wherein the (PFVE) monomer is selected from the group consisting of:

a per(halo)fluoroalkylvinylether complying with formula $CF_2=CFOR_{f1'}$ in which $R_{f1'}$ is a $C_1$-$C_{12}$-perfluoro(halo)alkyl group, optionally comprising at least one halogen atom different from fluorine, preferably is selected from a $C_1$-$C_6$-perfluoroalkyl group such as —$CF_3$, —$C_2F_5$, —$C_3F_7$ or $C_5F_{11}$, more preferably —$R_{f1}$ is $CF_3$; and a per(halo)fluorooxyalkylvinylether group of complying with formula $CF_2=CFOR_{OF'}$ with $R_{OF'}$ being a $C_1$-$C_6$-per(halo)fluorooxyalkyl group, optionally comprising at least one halogen atom different from fluorine, which comprises one or more than one ethereal oxygen atom, and preferably $R_{OF'}$ being a group of formula —$CF_2OR_{f2'}$ or —$CF_2CF_2OR_{f2'}$, with $R_{f2'}$ being a $C_1$-$C_6$-per(halo)fluoroalkyl group, optionally comprising at least one halogen atom different from fluorine, $R_{f2'}$ preferably being —$CF_3$.

Preferred per(halo)fluoroalkylvinylethers complying with formula $CF_2=CFOR_{f1'}$ include, notably, those wherein $R_{f1'}$ is the perfluorinated alkyl group —$CF_3$ (perfluoromethylvinylether (PMVE)), —$C_2F_5$ (perfluoroethylvinylether (PEVE)), —$C_3F_7$ (perfluoropropylvinylether (PPVE)), or —$C_4F_9$ or a —$C_5F_{11}$ group.

Preferred per(halo)fluorooxyalkyls complying with formula $CF_2=CFOR_{OF'}$ include, notably, those wherein $R_{OF'}$ is a group of formula —$CF_2OR_{f2'}$ and $R_{f2'}$ is a $C_1$-$C_3$ perfluoro(oxy)alkyl group, such as —$CF_2CF_3$, —$CF_2CF_2$—O—$CF_3$ and —$CF_3$.

The recurring units derived from (PFVE) monomer included in polymer (A) of the invention more preferably are derived from perfluoromethylvinylether (PMVE).

Recurring units derived from (FVE) monomer are preferably comprised in polymer (A) in an amount of from 0.05 to 10% by moles, more preferably from 0.1 to 7% by moles, still more preferably from 0.2 to 3.8% by moles with respect to the total moles of recurring units of polymer (A).

It is necessary that the total amount of recurring units (ii) and (iii) in said polymer (A) is at most 15% by moles, preferably at most 7% by moles, more preferably at most 4% by moles, with respect to the total moles of recurring units of polymer (A).

The inventors have found that best results are obtained when the polymer (A) is a linear semi-crystalline co-polymer.

The term "linear" is intended to denote a co-polymer made of substantially linear sequences of recurring units from (VDF) monomer, (meth)acrylic monomer and fluoroalkylvinylether (FVE); polymer (A) is thus distinguishable from grafted and/or comb-like polymers.

In a more preferred embodiment of the invention, in polymer (A) the recurring units derived from hydrophilic (meth)acrylic monomer (MA) are comprised in an amount of from 0.2 to 1.5% by moles with respect to the total moles of recurring units of polymer (A), and the recurring units derived from (FVE) monomer are comprised in an amount of from 0.2 to 3.8% by moles with respect to the total moles of recurring units of polymer (A).

Determination of average mole percentage of monomer (MA) monomer (FVE) and VDF recurring units in polymer (A) can be performed by any suitable method, NMR being preferred.

The polymer (A) may further comprise recurring units derived from one or more fluorinated comonomers (F) different from VDF.

By the term "fluorinated comonomer (F)", it is hereby intended to denote an ethylenically unsaturated comonomer comprising at least one fluorine atoms.

Non-limitative examples of suitable fluorinated comonomers (F) include, notably, the followings:
(a) $C_2$-$C_8$ fluoro- and/or perfluoroolefins such as tetrafluoroethylene (TFE), hexafluoropropylene (HFP), pentafluoropropylene and hexafluoroisobutylene;
(b) $C_2$-$C_8$ hydrogenated monofluoroolefins, such as vinyl fluoride; 1,2-difluoroethylene and trifluoroethylene;
(c) perfluoroalkylethylenes of formula $CH_2=CH-R_{f0}$, wherein $R_{f0}$ is a 01-06 perfluoroalkyl group;
(d) chloro- and/or bromo- and/or iodo-$C_2$-$C_6$ fluoroolefins such as chlorotrifluoroethylene (CTFE).

Should one or more fluorinated comonomers (F) be present, the polymer (A) comprises typically from 0.1 to 10% by moles, preferably from 0.3 to 5% by moles, more preferably from 0.5 to 3% by moles of recurring units derived from said fluorinated comonomer (F).

Nevertheless, embodiments wherein the polymer (A) is free from said additional comonomers (F) are preferred.

According to certain embodiments, polymer (A) consists essentially of recurring units derived from VDF and from (FVE) monomer.

According to other embodiments, polymer (A) consists essentially of recurring units derived from VDF, from (FVE) monomer and from (MA) monomer.

In a more preferred embodiment of the invention, the hydrophilic (meth)acrylic monomer (MA) is a hydrophilic (meth)acrylic monomer of formula (III) as above defined, still more preferably it is acrylic acid (AA), and the (FVE) monomer is a (PFVE) monomer, still more preferably is PMVE, and polymer (A) is a VDF-AA-PMVE terpolymer.

Excellent results have been obtained using a polymer (A) consisting essentially of:
from 0.2 to 1.5% by moles with respect to the total moles of recurring units of polymer (A) of recurring units derived from monomer (MA),
from 0.2 to 3.8% by moles with respect to the total moles of recurring units of polymer (A) of recurring units derived from (FVE) monomer; and
from 94.7% to 99.6% by weight, more preferably 96.0% to 98.3% by weight of recurring units derived from VDF.

It is understood that chain ends, defects or other impurity-type moieties might be comprised in the polymer (A) without these impairing its properties.

The intrinsic viscosity of polymer (A), measured in dimethylformamide at 25° C., is preferably comprised between 0.20 l/g and 0.60 l/g, preferably between 0.25 l/g and 0.50 l/g, more preferably between 0.25 g/l and 0.35 g/l.

More preferably, the intrinsic viscosity of polymer (A), measured in dimethylformamide at 25° C., is of about 0.30 l/g.

The polymer (A) is typically obtainable by emulsion polymerization or suspension polymerization of a VDF monomer, at least one hydrogenated (meth)acrylic monomer (MA), at least one monomer (FVE) and optionally at least one comonomer (F), according to the procedures described, for example, in WO 2007/006645 and in WO 2007/006646.

The polymerization reaction is generally performed at temperatures of between 25 and 150° C., at a pressure of up to 130 bar.

Polymer (A) is typically provided in the form of powder.

The process of the invention provides polymer (A) wherein the monomer (MA) has a substantially random distribution throughout the whole VDF backbone of the polymer (A).

The choice of the solvent (S) is not particularly limited provided that it is suitable for solubilising the polymer (A).

The solvent (S) is typically selected from the group consisting of:
alcohols such as methyl alcohol, ethyl alcohol and diacetone alcohol,
ketones such as acetone, methylethylketone, methylisobutyl ketone, diisobutylketone, cyclohexanone and isophorone,
linear or cyclic esters such as isopropyl acetate, n-butyl acetate, methyl acetoacetate, dimethyl phthalate and γ-butyrolactone,
linear or cyclic amides such as N,N-diethylacetamide, N,N-dimethylacetamide, dimethylformamide and N-methyl-2-pyrrolidone, and
dimethyl sulfoxide.

The electrode-forming composition (C) according to the invention may include optional additives, such as electroconductivity-imparting additives and viscosity modifying agents.

An electroconductivity-imparting additive may be added in order to improve the conductivity of a resultant composite electrode layer formed by applying and drying of the electrode-forming composition of the present invention.

The electroconductivity-imparting additive is typically selected from the group consisting of carbonaceous materials such as carbon black, carbon nanotubes, graphite powder, graphite fiber and metal powders or fibers such as nickel and aluminium powders or fibers.

The preferred positive electrode-forming composition (C) comprises:

a) positive electrode active material (AM) in an amount from 80 to 98% by weight, preferably from 90 to 97% by weight, with respect to the total weight of (a)+(b)+(c);

b) binder (B) in an amount from 0.5 to 10% by weight, preferably from 1 to 5% by weight, with respect to the total weight of (a)+(b)+(c);

c) a solvent (S); and carbon black as electroconductivity-imparting additive, in an amount from 1 to 10% by weight, preferably from 2 to 5% by weight with respect to the total weight of (a)+(b)+(c).

In a further instance, the present invention provides a process for preparing the composition (C) as above defined which comprises:

mixing the binder (B) with a portion of the solvent (S);

adding the active material (AM), optionally the electroconductivity-imparting additive and the residual solvent (S);

mixing the resulting suspension.

The electrode-forming composition (C) according to the invention has a total solid content that preferably ranges from 50 and 90% by weight, more preferably the total solid content ranges from 65 to 75% by weight.

In a second instance, the present invention pertains to the use of the electrode-forming composition (C) of the invention in a process for the manufacture of an electrode for electrochemical devices [electrode (E)], said process comprising:

(i) providing a metal substrate having at least one surface;

(ii) providing an electrode-forming composition (C) as defined above;

(iii) applying the composition (C) provided in step (ii) onto the at least one surface of the metal substrate provided in step (i), thereby providing an assembly comprising a metal substrate coated with said composition (C) onto the at least one surface;

(iv) drying the assembly provided in step (iii).

Under step (iv) of the process of the invention, drying may be performed either under atmospheric pressure or under vacuum. Alternatively, drying may be performed under modified atmosphere, e.g. under an inert gas, typically exempt notably from moisture (water vapour content of less than 0.001% v/v).

The drying temperature will be selected so as to effect removal by evaporation of one or more solvents (S) from the electrode (E) of the invention.

In a third instance, the present invention pertains to the electrode (E) obtainable by the process as above defined.

In a fourth instance, the present invention pertains to an electrochemical device comprising an electrode (E) of the present invention.

In particular, the present invention further pertains to a secondary battery comprising:

a positive electrode, and a negative electrode, wherein the positive electrode is the electrode (E) of the invention.

Should the disclosure of any patents, patent applications, and publications which are incorporated herein by reference conflict with the description of the present application to the extent that it may render a term unclear, the present description shall take precedence.

The invention will be now illustrated in more detail by means of the following examples whose purpose is merely illustrative and not limitative of the scope of the invention.

EXPERIMENTAL PART

Raw Materials

Polymer (Comp): VDF-AA (1.0% by moles) polymer having an intrinsic viscosity of 0.30 μg in DMF at 25° C.

Polymer (A-1): VDF-AA (1.0% by moles)-PMVE (1.7% by moles) polymer having an intrinsic viscosity of 0.294 μg in DMF at 25° C.

Polymer (A-2): VDF-AA (0.9% by moles)-PMVE (0.6% by moles) polymer having an intrinsic viscosity of 0.31 μg in DMF at 25° C.

Initiator agent: t-amyl-perpivalate in isododecane (a 75% by weight solution of t-amyl perpivalate in isododecane), commercially available from Arkema.

Suspending agent (B): Alcotex AQ38, a 38 g/l solution of Alcotex 80 in water: 80% hydrolyzed high molecular weight polyvinyl alcohol, commercially available from SYNTHOMER.

Active material AM1: $LiNi_{0.8}Co_{0.15}Al_{0.05}O_2$, commercially available from EcoPro Co., Ltd.

Active material AM2: $LiNi_{0.6}Co_{0.2}Mn_{0.2}O_2$, commercially available from Umicore SA.

Electroconductivity-imparting additive: C-NERGY™ SUPER C65, commercially available from Imerys Graphite & Carbon.

Determination of Intrinsic Viscosity of Polymer (A)

Intrinsic viscosity (η) [dl/g] was measured using the following equation on the basis of dropping time, at 25° C., of a solution obtained by dissolving the polymer (A) in N,N-dimethylformamide at a concentration of about 0.2 g/dl using a Ubbelhode viscosimeter:

$$[\eta] = \frac{\eta_{sp} + \Gamma \cdot \ln\eta_r}{(1+\Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r-1$, and $\Gamma$ is an experimental factor, which for polymer (A) corresponds to 3.

DSC Analysis

DSC analyses were carried out according to ASTM D 3418 standard; the melting point ($T_{f2}$) was determined at a heating rate of 10° C./min.

Example 1: Preparation of Polymer (A) and Polymer Comp

In a 4 litres reactor equipped with an impeller running at a speed of 650 rpm were introduced in sequence the demineralised water and 1.5 g/kg Mni (initial amount of monomers added in reactor before the set point temperature) of suspending agent (as detailed in Table 1). The reactor was purged with sequence of vacuum (30 mmHg) and purged of nitrogen at 11° C. Then 5.0 g of initiator agent were introduced. At a speed of 880 rpm, the acrylic acid (AA) and the perfluoromethyl vinyl ether (PMVE) were introduced. Finally, the vinylidene fluoride (VDF) was introduced in the reactor. The amounts of AA, PMVE and VDF in the polymers (A) used in the preparation of the polymer (A) according to the invention (and in the comparative polymer (Comp)) are reported in Table 1. The reactor was gradually heated until a set-point temperature at 55° C. and the pressure was fixed at 120 bar. The pressure was kept constantly equal to 120 bar by feeding during the polymerization, the acrylic acid in aqueous solution with a concentration of AA as described in the Table 1. After this feeding, no more aqueous solution was introduced and the pressure started to decrease. The polymerization was stopped by degassing the reactor until reaching atmospheric pressure. A conversion of monomers was reached as described in Table 2. The polymer so obtained was then recovered, washed with demineralised water and dried at 65° C. during all the night.

TABLE 1

| Polymers | Water g | VDF g | PMVE g | AA Initial g | AA feeding g ([AA] in water g/kg water) |
|---|---|---|---|---|---|
| (Comp) | 1997 | 1280 | 0 | 0.55 | 13.55 (14.9) |
| (A-1) | 2055 | 1216 | 66 | 0.55 | 13.55 (15.8) |
| (A-2) | 2030 | 1256 | 25 | 0.55 | 13.55 (15.3) |

In Table 2 the time and yield of polymerizations and the properties of the obtained polymers are reported.

TABLE 2

| | Time of polymerization | Yield | η in DMF at 25° C. | Tf2 | NMR composition (mol %) | | |
|---|---|---|---|---|---|---|---|
| | Minutes* | % | l/g | ° C. | VDF | PMVE | AA |
| (Comp) | 392 | 78 | 0.30 | 162.7 | 99.0 | — | 1.0 |
| (A-1) | 360 | 76 | 0.29 | 150 | 97.3 | 1.7 | 1.0 |
| (A-2) | 343 | 77 | 0.31 | 157.5 | 98.5 | 0.6 | 0.9 |

Example 2: General Procedure for the Preparation of Electrode-Forming Compositions Electrode-forming compositions were prepared by dissolving, respectively, polymer (Comp), polymer (A-1) and polymer (A-2) in N-methylpyrrolidone (NMP) to a concentration of 8% wt under mechanical stirring at room temperature using a SpeedMixer (Centrifugal mixer), and then predetermined amounts of the positive electrode active material, conductive material and residual NMP were added to the solution of polymer in NMP and thoroughly mixed with a Dispermat device equipped with a flat PTFE disc. The resulting slurries had a total solid concentration of 70% or 75% wt. In Table 3 the details of the electrode-forming compositions prepared in Example 2 are reported.

TABLE 3

| | Polymer (A) | Active material | Total solid content % |
|---|---|---|---|
| (C-1) | (Comp) | AM1 | 75 |
| (C-2) | (A-1) | AM1 | 75 |
| (C-3) | (A-2) | AM1 | 75 |
| (C-4) | (Comp) | AM2 | 70 |
| (C-5) | (A-1) | AM2 | 70 |
| (C-6) | (A-2) | AM2 | 70 |

Example 3: Electrode-Forming Compositions Gelation Evaluation

Compositions (C-1) and (C-3) have been prepared and subsequently visually observed to check their appearance.

The flowability properties of the compositions at different aging times, up to 48 hours, were evaluated in terms of capability and quality of casting the same on a PET foil (wet thickness 50 μm). The results are reported in Table 4.

TABLE 4

| | Polymer (A) | Flowability | | | | |
|---|---|---|---|---|---|---|
| | | T = 0 h | T = 2 h | T = 4 h | T = 24 h | T = 48 h |
| (C-1) | (Comp) | YES | YES | NO | NO | NO |
| (C-3) | (A-2) | YES | YES | YES | YES | YES |

Composition (C-1) did not allow for a good quality casting already after 4 h from its preparation. Clumps started to arise in the composition, not allowing its use. On the contrary, composition (A-2) showed good stability at least until after 48 h from the preparation.

In view of the above, it has been found that positive electrode-forming compositions (C) according to the present invention, thanks to the presence of the binder (B) including polymer (A) are characterized by an improved resistance to gelation.

Example 4: Preparation of Electrodes

Positive electrodes were obtained by applying the electrode-forming compositions (C-4), (C-5) or (C-6) obtained in Example 2 to a 20 μm thick aluminium foil so as to obtain a mass of dry positive electrode coating of 20 mg/cm$^2$ The solvent was completely evaporated by drying in an oven at temperature of 90° C. to fabricate a strip-shaped positive electrode.

The positive electrodes so obtained (electrode (E1), (E2) and (E3), respectively) had the following composition: 97% by weight of the active material AM2, 1% by weight of polymer (A), 2% by weight of conductive material.

Positive Electrodes Adhesion Evaluation

Positive electrodes (E1), (E2) and (E3) were cut in stripes (10 cm long and 2.5 cm wide) and applied onto rigid aluminium foils having thickness of 2 mm, using a biadhesive tape of dimensions 2.5×8 cm, with the coated side of the electrode facing the aluminium plate. A portion of the electrode is kept from adhering to the tape, thus leaving one end of each stripe not in contact with the biadhesive tape, allowing for its pulling from the foil.

Each specimen was pulled from the foil at an angle of 180° by a dynamometer that allowed the measurement of the force needed to peel off the sample from the biadhesive tape. Peeling speed is 300 mm/min, with T=25° C. The results are summarized in Table 5.

TABLE 5

| | Polymer (A) | Peeling Strength (N/m) |
|---|---|---|
| (E1) | (Comp) | 17.41 ± 1.53 |
| (E2) | (A-1) | 13.87 ± 0.48 |
| (E3) | (A-2) | 20.35 ± 0.47 |

The invention claimed is:

1. A positive electrode-forming composition (C) comprising:
   a) at least one positive electrode active material (AM), wherein the active material (AM) is selected from lithium-containing complex metal oxides of general formula (I)

$$LiNi_xM^1_yM^2_zY_2 \qquad (I)$$

wherein $M^1$ and $M^2$ are the same or different from each other and are transition metals selected from Co, Fe, Mn, Cr and V,
   $0.5 \leq x \leq 1$ and wherein $y+z=1-x$, and
   Y denotes a chalcogen;
   b) at least one binder (B), wherein binder (B) comprises at least one vinylidene fluoride (VDF) copolymer [polymer (A)] that comprises:
      (i) recurring units derived from vinylidene fluoride (VDF);
      (ii) recurring units derived from a fluoroalkylvinylether (FVE) monomer, wherein the (FVE) monomer is selected from the group consisting of:
         a (halo)fluoroalkylvinylether complying with formula $CF_2=CFOR_{f1}$ in which $R_{f1}$ is a $C_1$-$C_{12}$-fluoro-(halo)alkyl group or $C_1$-$C_{12}$-perfluoro-(halo)alkyl group, optionally comprising at least one halogen atom different from fluorine;
         a (halo)fluorooxyalkylvinylether group of complying with formula $CF_2=CFOR_{OF}$, with $R_{OF}$ being a $C_1$-$C_6$-(halo)fluorooxyalkyl or $C_1$-$C_6$-per(halo)fluorooxyalkyl group, optionally comprising at least one halogen atom different from fluorine, which comprises one or more than one ethereal oxygen atom; and
      (iii) recurring units derived from at least one hydrophilic (meth)acrylic monomer (MA) of formula (II):

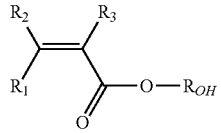

wherein each of $R_1$, $R_2$, $R_3$, equal or different from each other, is independently an hydrogen atom or a $C_1$-$C_3$ hydrocarbon group, and $R_{OH}$ is a hydrogen or a $C_1$-$C_5$ hydrocarbon moiety comprising at least one —COOH group,
      wherein the total amount of recurring units (ii) and recurring units (iii), when present, in said polymer (A) is of at most 15% by moles, with respect to the total moles of recurring units of polymer (A); and
   c) at least one solvent (S).

2. The composition (C) according to claim 1, wherein the positive electrode active material (AM) is selected from the group consisting of:
   $LiNi_{0.5}Mn_{0.3}Co_{0.2}O_2$,
   $LiNi_{0.6}Mn_{0.2}Co_{0.2}O_2$,
   $LiNi_{0.8}Mn_{0.1}Co_{0.1}O_2$,
   $LiNi_{0.8}Co_{0.15}Al_{0.05}O_2$, and
   $LiNi_{0.8}Co_{0.2}O_2$.

3. The composition (C) according to claim 2, wherein the positive electrode active material (AM) is selected from the group consisting of: $LiNi_{0.8}Co_{0.15}Al_{0.05}O_2$, $LiNi_{0.6}Mn_{0.2}Co_{0.2}O_2$ and $LiNi_{0.8}Mn_{0.1}Co_{0.1}O_2$.

4. The composition (C) according to claim 1, wherein polymer (A) comprises recurring units derived from at least one hydrophilic (meth)acrylic monomers (MA) selected from the group consisting of:
   acrylic acid (AA),
   (meth)acrylic acid,
   and mixtures thereof.

5. The composition (C) according to claim 4, wherein polymer (A) comprises recurring units derived from at least one hydrophilic (meth)acrylic monomer (MA) acrylic acid (AA).

6. The composition (C) according to claim 1, wherein (FVE) monomer is a perfluoroalkylvinylether (PFVE) monomer, wherein the (PFVE) monomer is selected from the group consisting of:
   a per(halo)fluoroalkylvinylether complying with formula $CF_2=CFOR_{f1}$, in which $R_{f1}$ is a $C_1$-$C_{12}$-perfluoro-(halo)alkyl group, optionally comprising at least one halogen atom different from fluorine; and
   a per(halo)fluorooxyalkylvinylether group of complying with formula $CF_2=CFOR_{OF}$, with $R_{OF}$ being a $C_1$-$C_6$-per(halo)fluorooxyalkyl group, optionally comprising at least one halogen atom different from fluorine, which comprises one or more than one ethereal oxygen atom.

7. The composition (C) according to claim 1, wherein (FVE) monomer is comprised in polymer (A) in an amount of from 0.05 to 10% by moles, with respect to the total moles of recurring units of polymer (A).

8. The composition (C) according to claim 1, wherein the hydrophilic (meth)acrylic monomer (MA) is comprised in an amount of from 0.05% to 2% by moles, with respect to the total moles of recurring units of polymer (A).

9. The composition (C) according to claim 7, wherein in polymer (A) the hydrophilic (meth)acrylic monomer (MA) is comprised in an amount of from 0.2 to 1.5% by moles with respect to the total moles of recurring units of polymer (A), and the (FVE) monomer is comprised in an amount of from 0.2 to 3.8% by moles with respect to the total moles of recurring units of polymer (A).

10. The composition (C) according to claim 1, wherein polymer (A) consists essentially of:
    from 0.2 to 1.5% by moles with respect to the total moles of recurring units of polymer (A) of recurring units derived from monomer (MA),
    from 0.2 to 3.8% by moles with respect to the total moles of recurring units of polymer (A) of recurring units derived from (FVE) monomer; and
    from 94.7% to 99.6% by weight of recurring units derived from VDF.

11. The composition (C) according to claim 1, wherein the solvent (S) is selected from the group consisting of:
    alcohols,
    ketones,
    linear or cyclic esters,
    linear or cyclic amides, and
    dimethyl sulfoxide.

12. A process for the manufacture of an electrode for electrochemical devices [electrode (E)], said process comprising:
    (i) providing a metal substrate having at least one surface;
    (ii) providing an electrode-forming composition (C) according to claim 1;
    (iii) applying the composition (C) provided in step (ii) onto the at least one surface of the metal substrate provided in step (i), thereby providing an assembly comprising a metal substrate coated with said composition (C) onto the at least one surface;
    (iv) drying the assembly provided in step (iii).

13. An electrode [electrode (E)] obtainable by the process of claim 12.

14. An electrochemical device comprising the electrode (E) according to claim 13.

15. The electrochemical device of claim 14 that is a lithium secondary battery.

16. The composition (C) of claim 1, wherein $R_{OF}$ is a group of formula —$CF_2OR_{f2}$ or —$CF_2CF_2OR_{f2}$, with $R_{f2}$ being a $C_1$-$C_6$-(halo)fluoroalkyl or $C_1$-$C_6$-per(halo)fluoroalkyl group, optionally comprising at least one halogen atom different from fluorine.

17. The composition (C) of claim 11, wherein:
the alcohol is selected from the group consisting of methyl alcohol, ethyl alcohol and diacetone alcohol;
the ketone is selected from the group consisting acetone, methylethylketone, methylisobutyl ketone, diisobutylketone, cyclohexanone and isophorone;
the linear or cyclic ester is selected from the group consisting of isopropyl acetate, n-butyl acetate, methyl acetoacetate, dimethyl phthalate and γ-butyrolactone; and
the linear or cyclic amide is selected from the group consisting of N,N-diethylacetamide, N,N-dimethylacetamide, dimethylformamide and N-methyl-2-pyrrolidone.

* * * * *